United States Patent [19]
Hutchinson

[11] Patent Number: 6,133,642
[45] Date of Patent: Oct. 17, 2000

[54] PORTABLE ELECTRICAL POWER GENERATING SYSTEM WITH MECHANICAL AND SOLAR POWER SOURCES

[75] Inventor: John Edward Hutchinson, Tamboerskloof, South Africa

[73] Assignee: Freeplay Market Development Limited, London, United Kingdom

[21] Appl. No.: 09/190,537

[22] Filed: Nov. 12, 1998

[51] Int. Cl.$^7$ ...................................................... H02P 9/04
[52] U.S. Cl. .............................................. 290/1 A; 322/1
[58] Field of Search .................................. 322/28, 29, 1, 322/7, 8, 10, 14; 290/1 R, 1 A, 1 D, 1 E; 362/193

[56] References Cited

U.S. PATENT DOCUMENTS

| | | | |
|---|---|---|---|
| 3,675,113 | 7/1972 | Bader et al. | 322/28 |
| 4,332,006 | 5/1982 | Choe | 362/193 |
| 4,360,860 | 11/1982 | Johnson et al. | 362/192 |
| 4,581,572 | 4/1986 | Yoshiyuki et al. | 322/86 |
| 4,799,003 | 1/1989 | Tu et al. | 322/29 |
| 4,939,707 | 7/1990 | Nagaro | 368/64 |
| 5,917,310 | 6/1999 | Baylis | 322/1 |

*Primary Examiner*—Nicholas Ponomarenko
*Attorney, Agent, or Firm*—Cobrin & Gittes

[57] ABSTRACT

A generator device for providing a controlled output current to a load, the device including a panel for generating electric current from light; a capacitor connected to the output of the panel; a source of stored energy; output terminals receiving power from the capacitor for connection to a load; a gear train connected to the source of stored energy so as to be driven thereby; a generator for supplying electric current to the output terminals and to the capacitor; output terminals for connection to a load; a source of stored mechanical energy; a generator for supplying electric current to a the output terminals and the capacitor; and a gear train connected to the source of the stored mechanical energy so as to drive the generator; a control circuit for controlling supply of electrical current to the output terminals from the panel, the capacitor and said generator, the control circuit including: a transistor switch arrangement for enabling current from the generator and the panel in excess of the load to charge the capacitor in addition to the output of the panel and for shorting the connection between the generator and the output terminals if the charge across the charged capacitor voltage exceeds a predetermined value. The release of mechanical energy is prevented and charge stored in the capacitor is enabled to supply power supplied to the load.

5 Claims, 5 Drawing Sheets

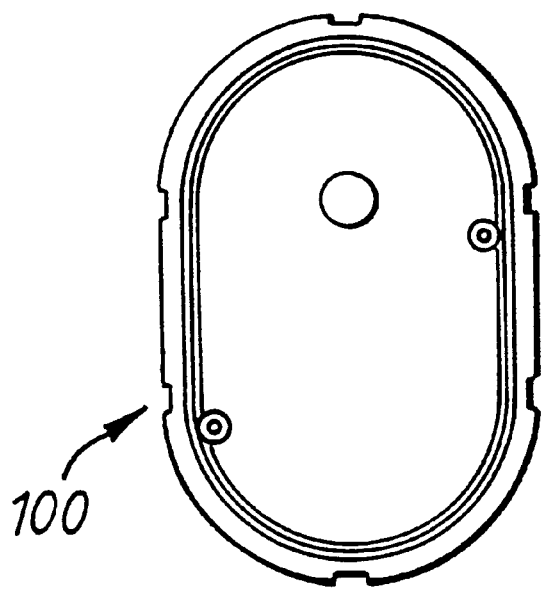
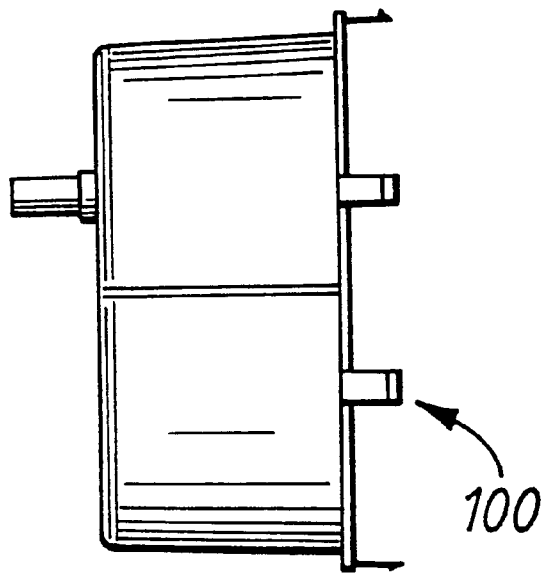
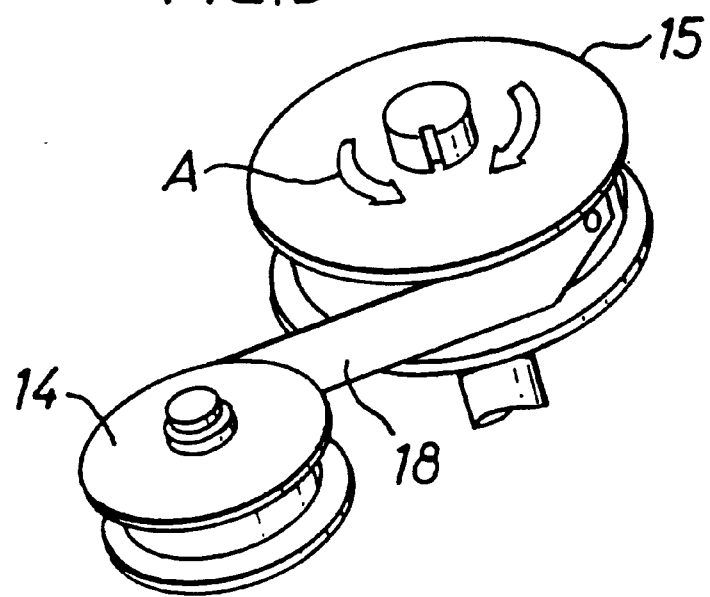

PORTABLE ELECTRICAL POWER GENERATING SYSTEM WITH MECHANICAL AND SOLAR POWER SOURCES

The present invention concerns apparatus for generating electric current. It is particularly concerned with providing a compact and reliable generator which is readily portable. Such a generator can find many fields of application one of which would be for use in providing power for portable radios in environments where there is no provision of electrical mains.

It is, of course, well-known to provide generators driven by pedal power. These, of course, require continuous effort in order to be operational. A radio having a removable spring-powered generator has been disclosed in UK Patent Specification No. 2262324 filed by the inventor of the present application. However, it proved exceptionally difficult to put into practice the basic concept described in the above UK patent specification. Many of the problems associated with mechanically powered generators have been overcome using the arrangements disclosed in U.S. patent application, Ser. No 08/704,404 now Pat. No. 5,917,310 the contents of which are herein incorporated in the present specification by reference.

The present invention is concerned with an improved version of the power supply disclosed and claimed in the above mentioned US patent specification.

In particular it is concerned with increasing the time for which the stored energy can be usefully used.

In accordance with the present invention there is provided a generator device for providing a controlled output current to a load, the device comprising:
 a) a panel for generating electric current from light;
 b) a capacitor connected to the output of said panel;
 c) a source of stored energy;
 d) a gear train connected to the source of stored energy so as to be driven thereby;
 e) output terminals for connection to a load;
 f) a generator for supplying electric current to said output terminals and to said capacitor; and
 g) a control circuit for controlling supply of electrical current to said output terminals from both said capacitor and said generator, the control circuit comprising:
 h) a transistor switch arrangement for enabling current from said generator in excess of said load to charge said capacitor in addition to the output of said panel and for shorting the connection between the generator and said output terminals if the charge across said capacitor exceeds a predetermined value whereby the charge stored in said capacitor is supplied to said load.

In order that the present invention may be more readily understood, embodiments thereof will now be described by way of example and with reference to the accompanying drawings in which:

FIGS. 3 and 4 are side and plan views of a removable power generating cassette which can be mounted in the radio of FIG. 1;

FIG. 5 is a view of a spring in the cassette of FIGS. 3 and 4;

Figure 1:
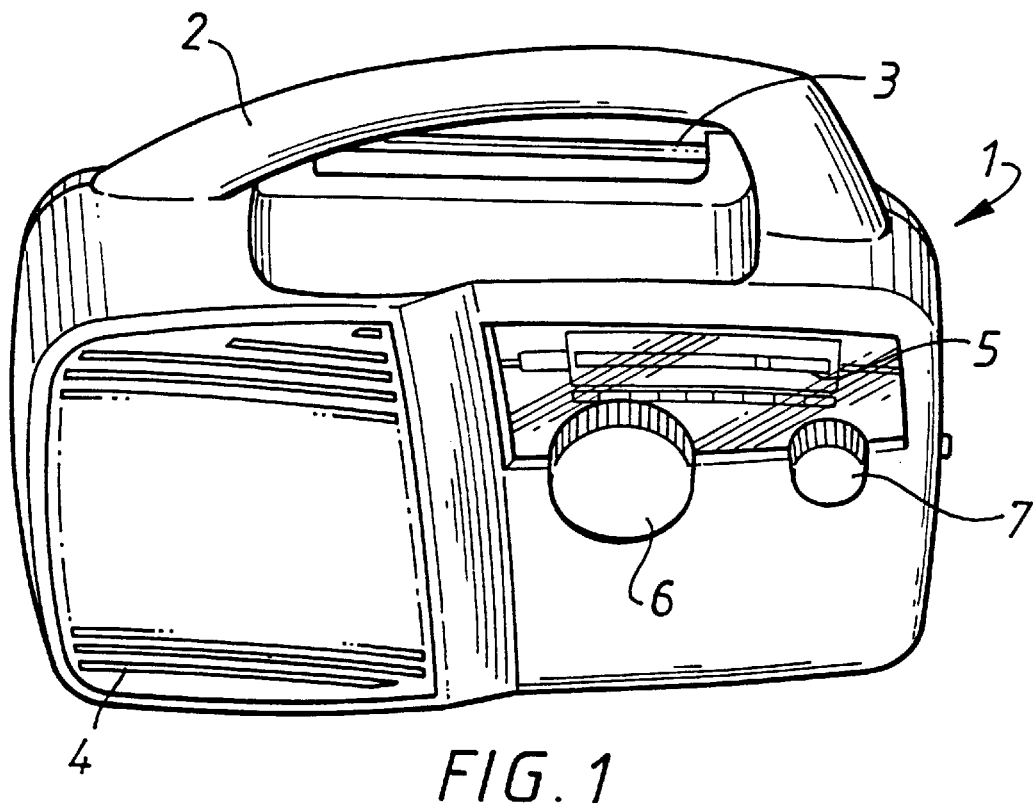
FIGS. 1 and 2 are perspective views of a radio incorporating the present invention.
Figure 2:
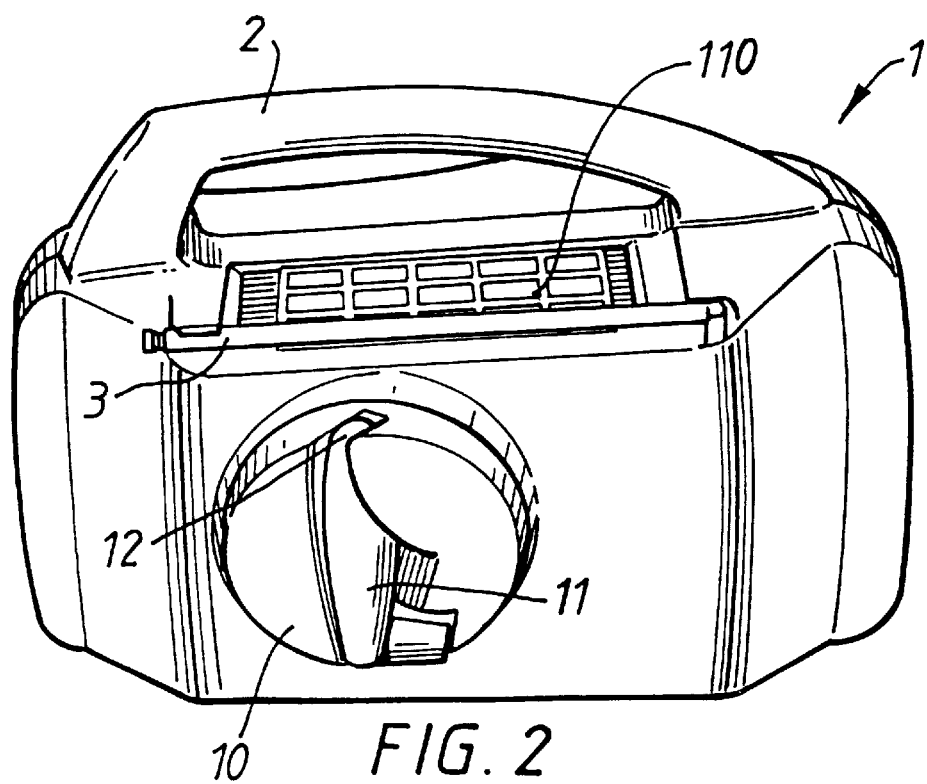

Referring now to FIG. 1 of the accompanying drawings, this figure shows a portable radio generally indicated at 1, and having a carrying handle 2 and a folding aerial 3. A loudspeaker grill is shown at 4 along with a station indicating panel 5. Tuning is controlled by a control knob 6 and volume by a control knob 7. The radio as viewed from FIG. 2 is formed with a rotatably mounted disc 10 having a handle 11 pivotally mounted at 12 to the rim of the disc so that the handle can be stowed when not in use as shown in FIG. 2 and when in use swung outwardly so as to project at right angles from the plane of the disc. This arrangement enables a user of the radio to wind up a power source mounted within the radio in the form of a spring. This spring is contained in a removable cassette shown in FIGS. 3 and 4 of the accompanying drawings and is shown in greater detail in FIG. 5. The outer casing of the radio is made from a tough moulded thermoplastics material and is formed in two halves. These halves are held by screws inserted via openings. The casing can thus be opened in a simple manner to enable the cassette to be exchanged.

As can be seen from FIG. 2 the radio also has a solar panel 110 which can also provide power to be used in the operation of the radio.

Referring now to FIGS. 3 and 4, these show a plan and a side view of a cassette 100 which acts as a power source for the radio shown in FIGS. 1 and 2. This cassette comprises a coil spring 18 mounted on a stage drum 14 and a torque drum 15 and which provides the motive power for a generator. The spring management is fully described in the aforesaid patent specification. Accordingly no further detailed description will be given.

Figure 6:
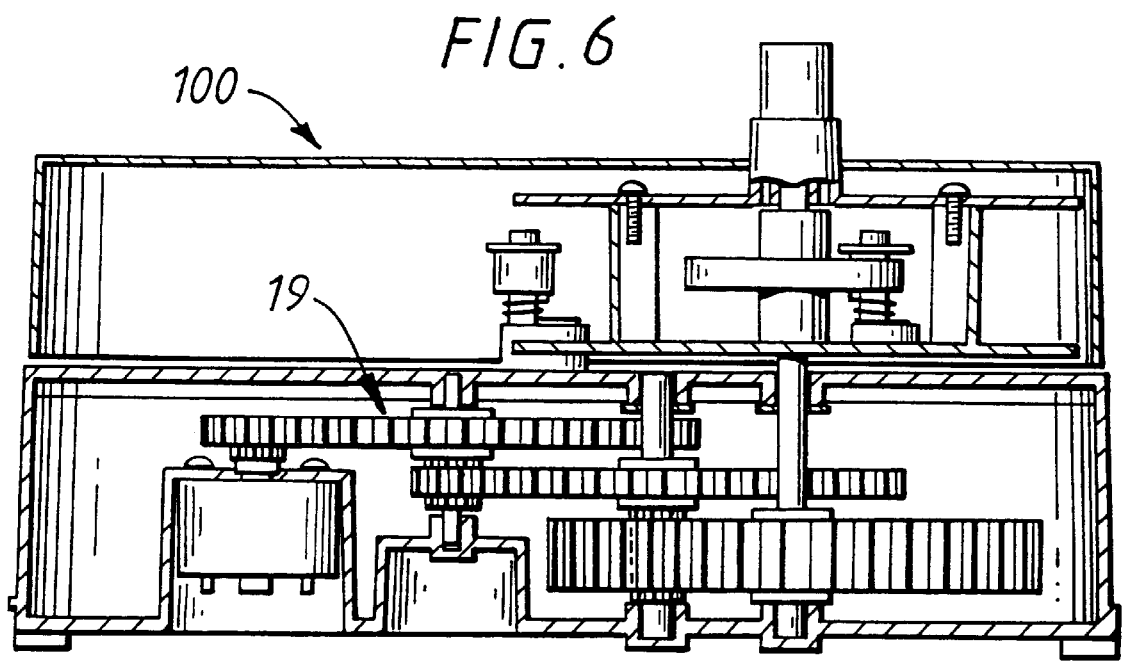
FIG. 6 is a section through a gearbox associated with the cassette of FIGS. 3 and 4.

Associated with this spring in the cassette for the radio is a gear train generally indicated in FIG. 6 at 19 for driving a DC generator. This gear box is also described in detail in U.S. Patent Specification Ser. No 08/704,404 and will not be described in detail in the present specification.

Figure 7:
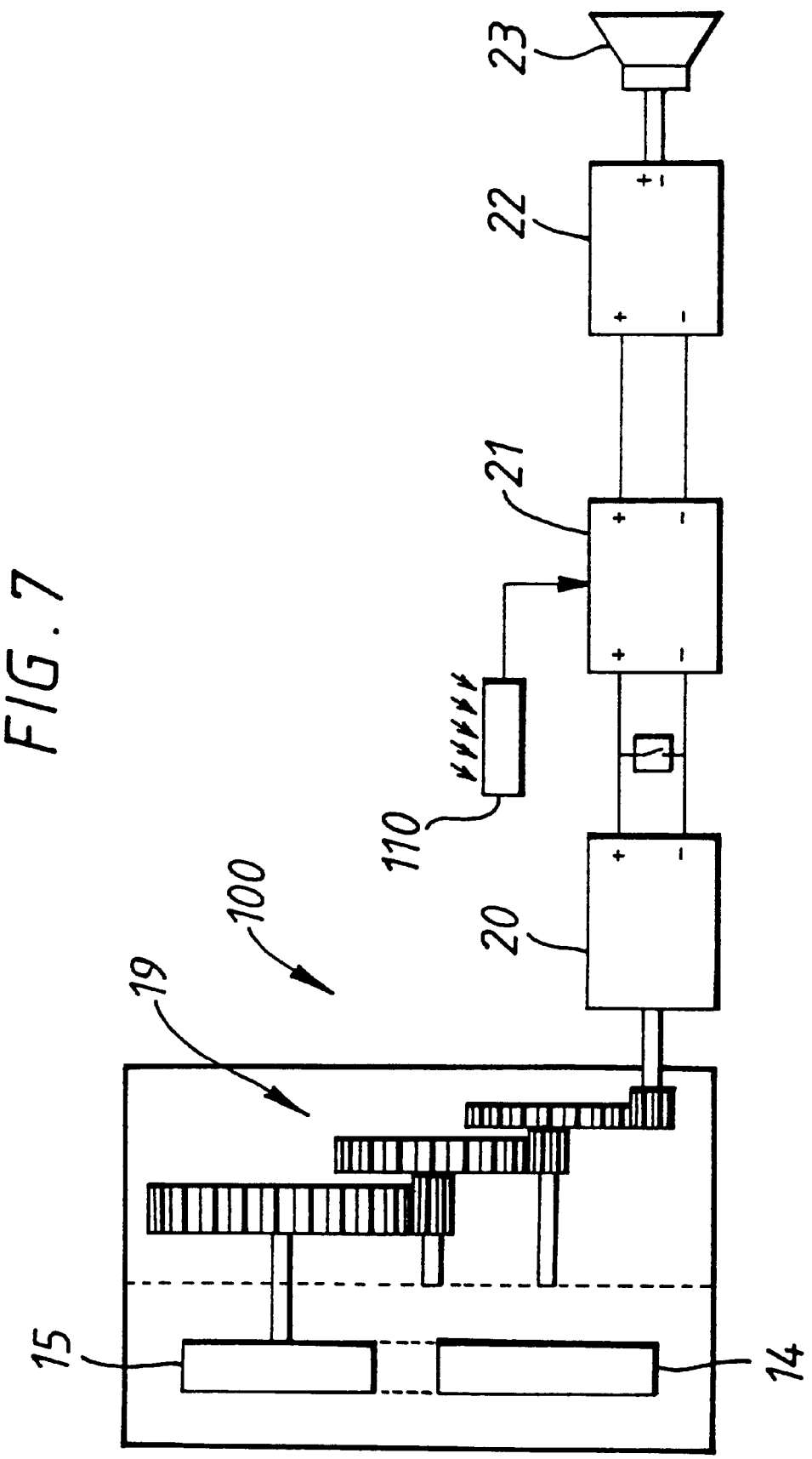
FIG. 7 is a block diagram illustrating the arrangement of the main components of the radio of FIG. 1.

Specifically referring now to FIG. 7 this figure shows in diagrammatic form the solar panel 110; a power source including the storage drum 14, a torque drum 15 and a spring 18 which are internal components of cassette 100; the gear train 19 which is part of the gear box of FIG. 3, a DC generator 20 which in operation is driven by the energy released from the spring through the gear train 19, a power control circuit 21, a radio circuit 22, and a loudspeaker 23. In this embodiment the DC generator 20 is a standard tape cassette brushed DC motor made by Mabuchi and turned in reverse to generate electricity.

Figure 8:
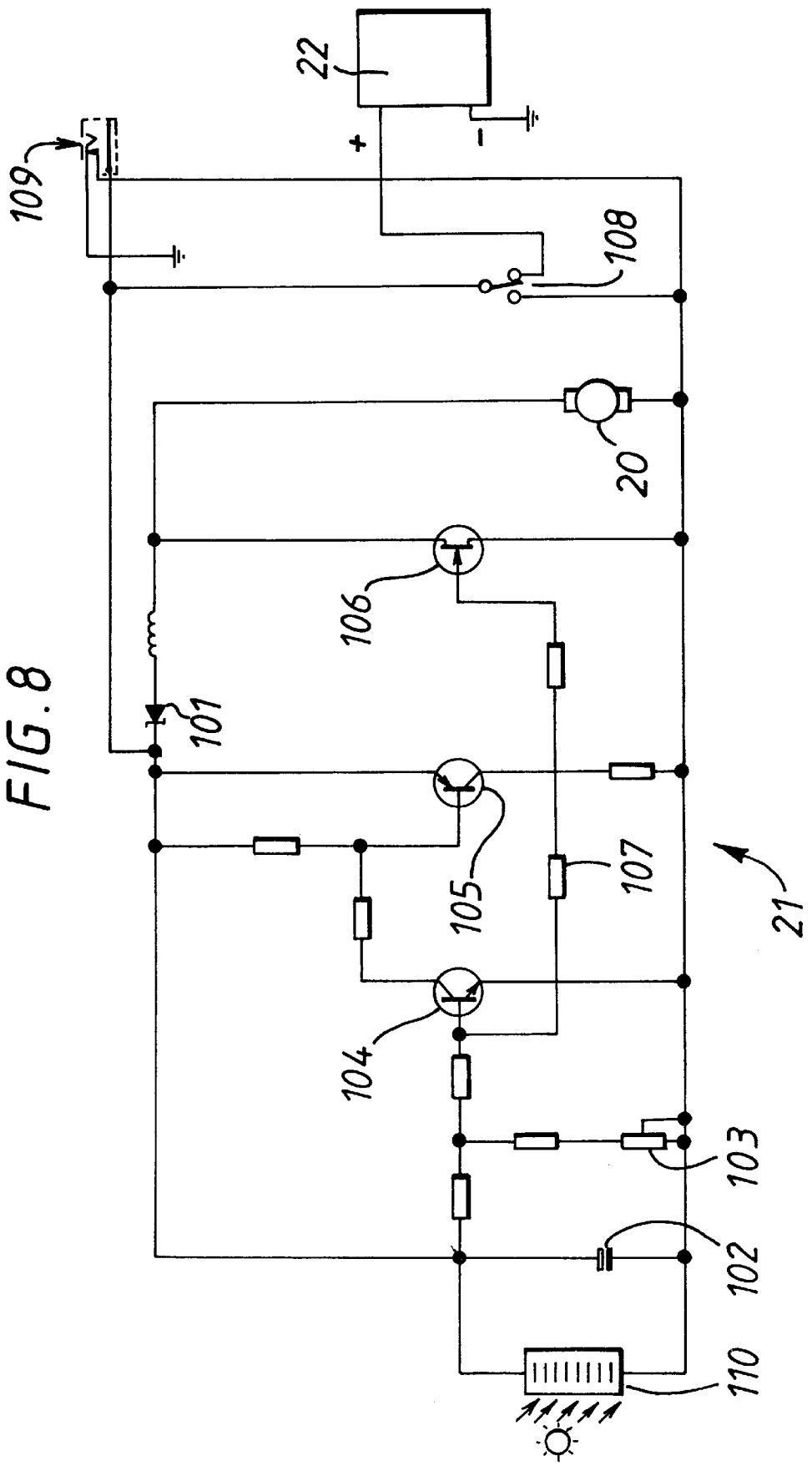
FIG. 8 is a diagram of a control circuit.

FIG. 8 shows the power control circuit 21 in greater detail. The operation of this circuit is as follows. Torque from the spring 18 mounted in cassette 100 rotates the generator armature through the gear train 19 to create current. Generated current flows through Schottky diode 101 to the radio 22 and to storage capacitor 102. Initially generated current flows into capacitor 102 causing the voltage across it to rise. When the voltage across capacitor 102 reaches a predetermined value which is set by potentiometer 103 transistor 104 switches transistor 105 which in turn switches FET transistor 106. This shorts the generator terminals and virtually halts the motor and spring system. This is because the very high gearing of the generator means that a minimal increase in load across the output terminals of the generator will effectively brake the system. Transistor 105 has a positive feedback connection via resistor 107 keeping transistor 104 switched on.

During the phase where the spring system is stationary, current flows (back) from capacitor 102 and continues to power the wireless 22. Diode 101 prevents any reverse current flow to generator. As capacitor 102 continues to power the radio, the voltage across it diminishes until the voltage across transistor 104 becomes insufficient for transistor 105 to keep transistor 104 switched on. As this low voltage threshold, which is the minimum voltage required by radio circuit 22, is reached, the three transistors 104,105, 106 are switched "off". The generator 20 is no longer shorted and the spring system causes armature speed-up and current once again flows from the generator to capacitor 102 and the radio 22.

If again the current from generator 20 exceeds the radio demand, then the voltage across capacitor 102 will rise again to the predetermined value and the cycle just described is repeated.

The solar panel 110 is connected in parallel to capacitor 102 and any current generated by this panel contributes to the generator stream. This improves the flow to capacitor 102 and increases the likelihood of capacitor 102 reaching the value where the generator is shorted and the spring energy saved (as described above).

Should solar energy alone be sufficient to supply the radio demand, the voltage across the solar panel 110 is sufficient to keep transistor 104 switched, which in turn continuously maintains a shorted generator condition with consequent preservation of spring energy.

The solar panel therefore also acts as a trigger. Should solar energy be sufficient to power the radio circuit 22, it will trigger transistor 104 and cause transistor 106 to switch, shorting the generator 20 and preserving spring energy. The radio circuit will then be powered exclusively by the solar panel whilst the spring engine is shut down.

Should solar energy be available but insufficient to sustain radio demand alone, it will still contribute to the generator current to capacitor 102. This decreases the spring "on" period and increases the spring "off" (stationary) period. This provides for a longer spring unwind time than without the arrangement which has just been described.

The circuit shown in FIG. 8 is also provided with a pair of ganged switches 108, 109. Switch 109 is a single pole socket switch which responds to the insertion of a plug (not shown) to open switch 108 so as to isolate the output of the generator 20 from the radio circuit 22 and to enable the radio circuit 22 to be powered solely by current from socket switch 109. Power from socket switch 109 travels directly from the socket switch via switch 108 to the radio circuit 22.

It will thus be appreciated that the primary purpose of the control circuit is to ensure that the radio, in the embodiment being described, or any other load that requires an electric current for operation, both receives the correct amount of power and that the energy stored in the spring cassette is not wasted.

It will be appreciated that the foregoing description has been directed to a portable radio with a removable spring powered generator cassette. It is, of course, entirely possible for the generator to be used for a wide range of other applications. Such applications could, of course, include charging batteries, providing power for other electronic equipment such as computers or calculators or even providing power for games equipment. It is, of course, not necessary for the actual mechanical source of power to be a spring of the nature described with regard to the preceding embodiments. The spring could be of an alternative material as there are now some extremely strong elastomeric materials which could be used to provide the motive power. It is additionally possible for the motive power to be provided by a compressed gas source expelling the gas through a suitable converter which converts the energy of the escaping gas into rotational energy for driving a generator. If the gas were air then a suitable pump would be provided in order to compress the gas for subsequent use.

What is claimed is:

1. A generator device for providing a controlled output current to a load, the device comprising:

a) a panel for generating electric current from light;
   b) a capacitor connected to the output of said panel;
   c) output terminals receiving power from said capacitor for connection to a load;
   d) a generator for supplying electric current to said output terminals and to said capacitor;
   e) a source of stored mechanical energy;
   f) a gear train connected to the source of said stored mechanical energy so as to drive said generator;
   g) a control circuit for controlling supply of electrical current to said output terminals from said panel, said capacitor and said generator, the control circuit comprising:
   h) a transistor switch arrangement for enabling said generator and said panel to charge said capacitor and for shorting the connection between the generator and said output terminals if the charged capacitor voltage exceeds a predetermined value whereby the release of mechanical energy is prevented and said capacitor is enabled to supply power to said load.

2. A generator device according to claim 1, wherein the transistor switch arrangement comprises three transistors, a first transistor connected across the capacitor and triggered when the charge across the capacitor exceeds said predetermined value, a second transistor the base of which is connected to an electrode of said first transistor and an electrode of which is connected to the base of the third transistor, the electrodes of which are connected across the outputs of the generator so that when said second transistor is switched on by said first transistor, said third transistor shorts the output of said generator.

3. A generator device according to claim 2, wherein said third transistor is a FET transistor.

4. A generator device according to claim 1, and including a Schottky diode to prevent current flowing from said capacitor to said generator.

5. A generator device according to claim 1, and further comprising a first switch for connecting the output of the generator to the load, and a socket switch for connecting the generator device to an external power source, operation of the socket switch to connect an external power source of the load causing said first switch to disconnect said generator from the load.

* * * * *